(12) United States Patent
Negahban et al.

(10) Patent No.: US 11,410,468 B1
(45) Date of Patent: Aug. 9, 2022

(54) CLOUD-BASED SOFT DIGITAL METER FOR TAXI TRANSPORTATION

(71) Applicant: BEAMLIVE INC., Woodside, CA (US)

(72) Inventors: Mehrdad Negahban, McLean, VA (US); Ali Akbari, Cupertino, CA (US); Allan Dunsmuir, Newtown (AU); Muhammad Usman Khan, Lahore (PK)

(73) Assignee: BEAMLIVE INC., Woodside, CA (US)

( * ) Notice: Subject to any disclaimer, the term of this patent is extended or adjusted under 35 U.S.C. 154(b) by 0 days.

(21) Appl. No.: 17/460,197

(22) Filed: Aug. 28, 2021

(51) Int. Cl.
| | | |
|---|---|---|
| *G07B 15/02* | (2011.01) | |
| *G07B 13/04* | (2006.01) | |
| *G07B 13/06* | (2006.01) | |
| *G06Q 10/06* | (2012.01) | |
| *H04W 4/021* | (2018.01) | |
| *G06Q 50/30* | (2012.01) | |
| *G06F 3/048* | (2013.01) | |
| *G06Q 10/02* | (2012.01) | |
| *G07B 13/08* | (2006.01) | |

(52) U.S. Cl.
CPC ............ *G07B 13/04* (2013.01); *G06F 3/048* (2013.01); *G06Q 10/02* (2013.01); *G06Q 10/063114* (2013.01); *G06Q 50/30* (2013.01); *G07B 13/06* (2013.01); *G07B 13/08* (2013.01); *H04W 4/021* (2013.01)

(58) Field of Classification Search
CPC ........ G07B 13/04; G06F 3/048; G06Q 10/02; G06Q 50/30
USPC .......................................................... 235/384
See application file for complete search history.

(56) References Cited

U.S. PATENT DOCUMENTS

| | | | | |
|---|---|---|---|---|
| 2017/0365030 A1* | 12/2017 | Shoham | ................ | G08G 1/202 |
| 2019/0228663 A1* | 7/2019 | Meyers | ................ | G08G 1/202 |
| 2020/0211142 A1* | 7/2020 | James | ................ | G06Q 50/30 |
| 2021/0107529 A1* | 4/2021 | Hirose | ................ | B60Q 1/50 |
| 2021/0125201 A1* | 4/2021 | Migita | ................ | G06N 20/00 |
| 2021/0142373 A1* | 5/2021 | Takahara | ................ | G06Q 10/02 |

* cited by examiner

*Primary Examiner* — Ahshik Kim
(74) *Attorney, Agent, or Firm* — Aslan Law, P.C.

(57) ABSTRACT

A taxi metering system includes an administrative component and a mobile meter app, respectively configured to run on a server and a mobile metering device. The mobile meter receives GPS data that is map-matched by a map-matching server and used, with other fare parameters to calculate a total fare. The mobile meter app calculates a fare amount in near real time and conveys information to the administrative component. The administrative component monitors and records fare parameters and corresponding fare attributes to generate a ride summary and receipt.

27 Claims, 5 Drawing Sheets

| Status | B1 | B2 | B3 |
|---|---|---|---|
| Normal | Start | Calibrate | Logout |
| En route | Start | Calibrate | Cancel |
| Metering | Fixed Rate | Pause/Reset | Stop |
| Paused | Fixed Rate | Resume | Stop |

CLOUD-BASED SOFT DIGITAL METER FOR TAXI TRANSPORTATION

SUMMARY

This Summary introduces a selection of concepts in a simplified form in order to provide a basic understanding of some aspects of the present disclosure. This Summary merely presents some of the concepts of the disclosure as a prelude to the Detailed Description provided below.

According to an embodiment a taxi metering system includes first and second non-transitory storage media respectively having stored thereon instructions that providing an administrative component when executed on a computer, and a mobile app when executed by a mobile meter device of the taxi metering system. The administrative component of the taxi metering system includes a graphical user interface for presentation on a computer display. The administrative component is configured to remotely establish a first set of fare attributes associated with one or more respective geographic operation areas, and to authorize and deauthorize operation of the mobile meter device based on whether or not the mobile meter device is within a predetermined geographic operation area of the one or more respective geographic operation areas. The mobile app causes the mobile meter device to present a graphical user interface (GUI) of the mobile app on a display of the mobile meter device. The mobile app includes a mobile meter device authentication unit, a driver authentication unit, a fare calculating unit and a notification and indicator unit. The fare calculating unit is configured to receive the first set of fare attributes from the administrative component and to dynamically calculate a fare based on the first set of fare attributes and a second set of fare attributes entered via the GUI.

Further scope of applicability of the present invention will become apparent from the Detailed Description given below. However, it should be understood that the Detailed Description and specific examples, while indicating preferred embodiments of the present invention, are given by way of illustration only, since various changes and modifications within the spirit and scope of the present invention will become apparent to those skilled in the art from this Detailed Description.

BRIEF DESCRIPTION OF THE FIGURES

These and other objects, features and characteristics of the present disclosure will become more apparent to those skilled in the art from a study of the following Detailed Description in conjunction with the appended claims and figures, all of which form a part of this specification. In the figures:

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following detailed description.

DETAILED DESCRIPTION

The following description provides specific details for a thorough understanding and enabling description of these examples. One skilled in the relevant art will understand, however, that the present invention may be practiced without every disclosed detail. Likewise, one skilled in the relevant art will also understand that the present invention may additionally include inherent features or features obvious to one skilled in the art which are not described in detail herein. Additionally, some well-known structures or functions may not be shown or described in detail below, so as to avoid unnecessarily obscuring the relevant description.

Descriptions of well-known starting materials, processing techniques, components and equipment may be omitted so as not to unnecessarily obscure the present invention in detail. It should be understood, however, that the detailed description and the specific examples, while indicating (e.g., preferred) embodiments of the present invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Taxi metering systems conventionally calculate fares by measuring distance and/or time selectably based on manual driver input. Distance has conventionally been measured using wheel or transmission sensor, and time-based fares have been calculated by manually selecting a wait-time mode of a meter. More modern taxi metering systems do not require wheel sensors and mechanical calculations. Instead, they may employ global positioning system (GPS) signals to provide coordinates and times for calculating distance and times. However, publicly available GPS signals are only accurate to within about 20 feet. In some scenarios, this inaccuracy can aggregate over time, resulting in fares that may cost a passenger 5% or more extra, or may result in an undercharge, costing the driver and operator. The inventors have devised a system and method for accurately measuring distance and time, applying the results for greater transparency to passengers, increasing the trust between passenger and operator or driver, improving safety to both driver and passenger, increasing the ease of matching passengers with drivers, vehicles and needs, and improving logistics.

Figure 1:
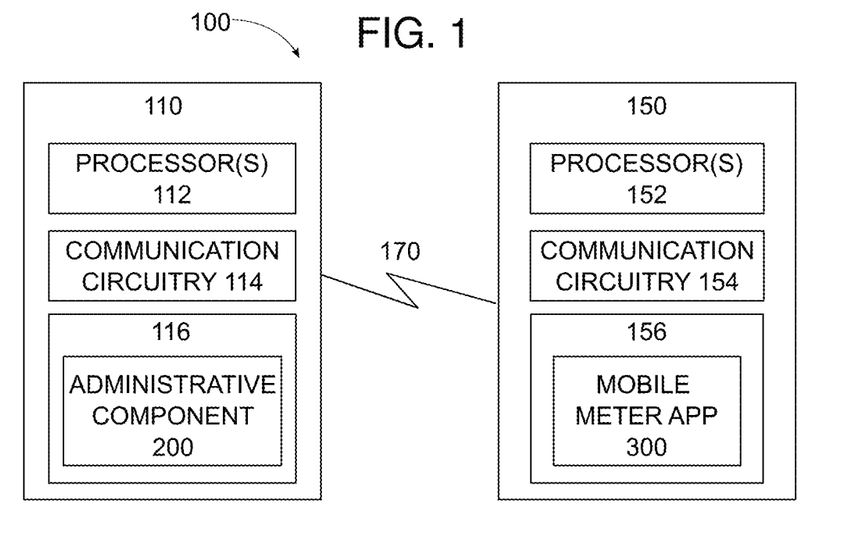
FIG. 1 is a block diagram illustrating elements of an accurate taxi metering system, according to an embodiment.

FIG. 1 is a block diagram illustrating elements of a taxi metering system 100, according to an embodiment. The taxi metering system 100 may include a first non-transitory storage medium 116 in a server computer 110 holding instructions that, when executed by server computer 110, perform operations of an administrative component 200 of the taxi metering system 100. The server computer 110 may further include one or more processors 112 and communications circuitry 114. The taxi metering system 100 may further include a second non-transitory storage medium 156 holding instructions that, when executed a mobile meter device 150, cause the mobile meter device 150 to perform operations of a mobile meter app 300 of the taxi metering system 100. The mobile meter device 150 may further include one or more processors 152 and communications circuitry 154. The server computer 110 and the mobile meter device 150 may communicate via a wireless network 170 such as, but not limited it, the Internet and/or a private wireless network using common mobile network protocols (e.g., cellular, TDMA, CDMA, LTE, LTE-A, HSPA, etc.), Wi-Fi, or the like.

Figure 2:
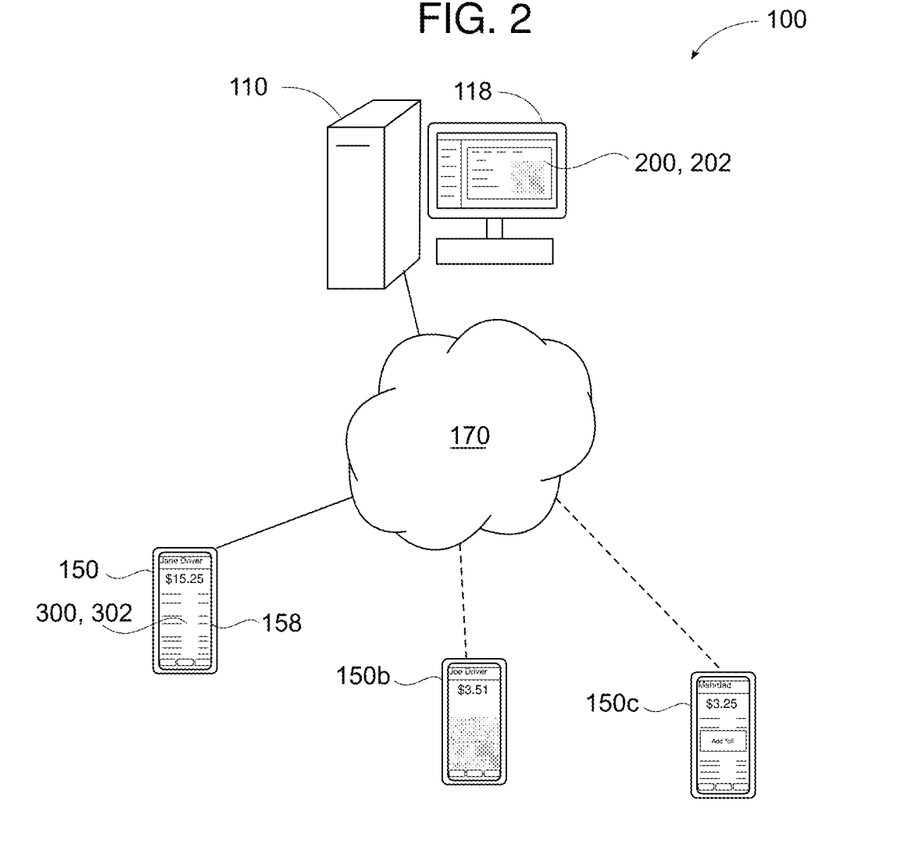
FIG. 2 is a block diagram illustrating an implementation of elements of a taxi metering system, according to an embodiment.

FIG. 2 is a block diagram illustrating an implementation of elements of the taxi metering system 100, according to an embodiment. The server computer 110 may communicate via the wireless network 170 with one or more of the mobile meter devices 150, 150b, 150c. In some instances, the server computer 110 may broadcast information for use by all associated mobile meter devices, while in other instances the server computer 110 may communicate specifically with a single mobile meter device 150. According to an embodiment, an administrator utilizing the administrative component 200 may view a graphical user interface 202 of the administrative component on a display 118 of the server computer 110. The display 118 may be directly coupled with the server computer 110, or may be part of a remote terminal (not shown), such as a desktop computer, tablet, smart phone, or a network appliance. For example, the administrator may access the server 110 remotely to manage the administrative component 200 via, e.g., a secure web page.

Each mobile meter device 150 may include a display screen 158 that displays a graphical user interface 310 of the mobile meter app 300. The administrative component 200 and mobile meter app 300 are described in detail below.

Figure 3:
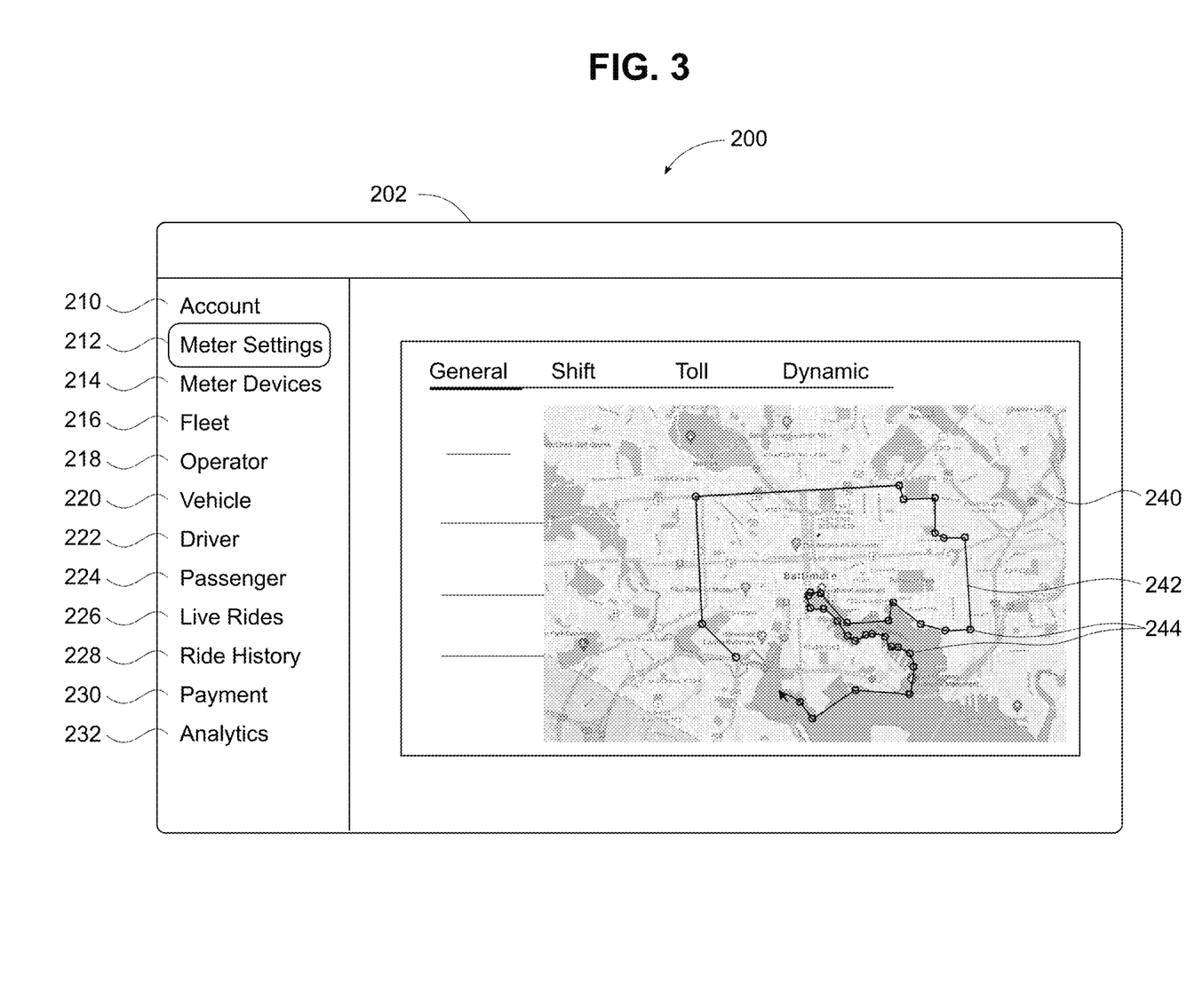
FIG. 3 is a diagram of a graphical user interface (GUI) of the administrative component, according to an embodiment.

FIG. 3 is a diagram of the graphical user interface (GUI) 202 of an administrative component 200 in an accurate taxi metering system 100, according to an embodiment. The administrative component 200 may also be referred to as a "Cloud Administrative Portal". The GUI 202 may be presented on the computer display 118, and may provide, to an administrator, access and management control of many aspects of the taxi metering system 100. For example, as represented along the left side of FIG. 3, the administrative component 200 may include any one or more of: controls for entering and/or managing the present administrator's account 210, controls for entering and/or managing meter settings 212; controls 214 for managing meter devices (e.g., meter devices 150); controls for managing and monitoring in real time fleet information 216; controls for entering and/or managing an operator 218 (e.g., an entity that controls several drivers and/or vehicles); controls 220 for managing vehicles (e.g., taxis) associated with the system 100; controls 222 for entering and/or managing drivers; controls 224 for entering and/or managing passengers; controls and/or tools 226 for managing and monitoring current rides; controls 228 for reviewing and managing ride histories; controls 230 for managing, monitoring and/or reviewing payments from passengers and/or payments to operators and drivers; and controls 232 for viewing analytics associated with use of the system.

Those having skill in the art will acknowledge that systems may be fashioned that include some or all of the disclosed controls in various combinations.

The administrative component 200 may be configured, remotely from the mobile meter device 300, to establish a first set of fare attributes associated with a geographic operation area (also referenced as a "geofence"). Each geographic operation area (geofence) may be defined, via the administrative component 200, using radionavigation coordinates such as are used by a global positioning system (GPS) corresponding to government or other mandated boundaries for metering districts. Stated another way, GPS coordinates may be entered or identified to define boundaries of a geofence. According to an embodiment, an administrator may define a geographic operation area (geofence) by creating, e.g., by drawing, boundaries on a map 240 presented in the GUI 202, where the drawn boundaries 242 may be identified with radionavigation coordinates (geofence coordinates), e.g., 244, by the administrative component 200.

The administrative component 200 may be configured to authorize and deauthorize operation of a mobile meter device 150, and/or may reconfigure the parameters for fare calculation in the mobile meter device 150, based on whether or not the mobile meter device 150 is within a predetermined geographic operation area (i.e., a geofence) of the one or more respective geographic operation areas.

The first set of fare attributes may include a distance rate, a wait-time rate, a traveled time rate, and/or other fixed rate such as a hiring fee. The first set of fare attributes may further include a booking fee, a vehicle type multiplier, a service type multiplier, a moving distance index, a wait time index, and/or a traveled time index. The first set of fare attributes may be set by the administrative component 200 for all mobile meter devices (150, 150b, 150c, etc.) that are authorized within a geofence, e.g., a predetermined geographic area, multiple predetermined geographic areas, or fare districts/zones. According to an embodiment, the geographic operation areas may be defined by a set of map-matched, satellite-based radionavigation coordinates constituting a boundary. As described above, the boundary (geofence) may be initially entered manually, e.g., by drawing the boundary on an electronic map, or may be based on coordinates provided for each service area, using maps from cloud-based vendors. The boundaries may be defined by government ordinance, by assigned routes, or the like. The first set of fare attributes may be associated with at least one meter shift of a plurality of meter shifts. A meter shift is a time period in which a driver is available to accept ride requests. For example, each meter shift may correspond to one or more predetermined time periods each defined by at least one of a shift start time, a shift stop time, a day of the week, an event in a geofenced area, a traffic status, an event traffic status, and a shift duration.

According to an embodiment, the GUI 202 for the administrative component 200 may include features for administrating vehicles and drivers on a granular or aggregated level. For example, the controls 214 may catalogue and control access individually for a plurality of mobile meter devices (e.g., mobile meter device 150). A record for each meter device may be uniquely identified using a device identifier such as an International Mobile Equipment Identity (IMEI), and the administrative component may store the device identifier along with one or more of a device type, date put into service, operating system, operating system version, owner(s), associated vehicle(s), and the like. In some instances, a business operator may own several vehicles—a fleet—such that all of the meter devices and vehicles associated with the fleet can be accessed via the fleet control 216. Any of a plurality of drivers may be associated with meter devices and vehicles of the fleet, and the administrative component 200 may set attributes for all meters, vehicles, and drivers in the fleet. For example, all meters belonging to a fleet may, via the fleet control 216, be configured to have a particular distance rate, wait-time rate, geofence, hiring rate, or the like; whereas another fleet may have different attributes assigned.

The administrative component 200 may include a vehicle control 220 for accessing vehicle information for vehicles associated with the accurate taxi metering system 100. For example, when a vehicle is newly associated with the system, the owner or driver (or an administrator) may enter vehicle information, include one or more of a vehicle identification number (VIN), year, make, model, license number and state, condition, mileage, last service date, any complaints from drivers or passengers regarding the vehicle, date(s) of accidents and/or non-moving citations (e.g., for broken tail light), associated mobile meter device(s), associated driver(s), associated operator/owner, and the like. The administrative component may, in some embodiments, receive an authentication request or login from a driver that includes selection (or default assignment) of a vehicle. The administrative component 200 may analyze the stored vehicle information to ensure the vehicle is in proper condition for operation before validating such authentication request. The vehicle control 220 may be configured to store, in association with information for a vehicle, incoming distress call information from drivers assigned to the vehicle.

The administrative component 200 may include a roster of drivers generally (as opposed to fleet-specific drivers), information for which may be entered, accessed, and/or monitored via a driver control 222. An administrator may view logs for drive times, number of fares, driver shifts, geographic coverage for a particular shift time of day and the like. The administrative component 200 may also monitor and control authentication of drivers through their respective mobile meter apps 300. More specifically, for example, when a driver attempts to log in to her mobile meter app 300 the administrative component may review its record to ensure the driver is licensed, accident/citation free, and/or has had sufficient time for rest since the driver's last shift before validating the driver's authentication request.

The administrative component may include passenger controls 224 for accessing a passenger database. The passenger database may include, for each passenger, one or more of: a name, one or more associated addresses, a registration date, a gender indication, payment information (e.g., credit card information or payment preference), a list of past or current rides, complaints and resolutions. In some embodiments, the administrative component may analyze past rides and determine a frequent pickup address and/or a frequent drop-off address. According to an embodiment, the administrative component 200 may suggest a route to the passenger during a ride request based on past rides as a time-saving feature. The passenger database may also include, for each passenger, a preferences profile including zero or more of: driver preference (by driver ID or name, gender, spoken language, chattiness, speed, and/or etc.), vehicle preference (e.g., for cargo, number of people, luxury accommodation, electric vehicle, vehicle color, and/or etc.), requested extras (child safety features, bike/ski rack, etc.), and/or preferred times of day for rides.

The live rides control 226 of the administrative component 200 may provide access to all ongoing rides, and may selectably display information regarding the vehicle, driver, passenger, source and destination addresses, estimated route and cost, a map of the ride in progress including "breadcrumb" indicators for each ride segment, an update of calculated fare, an image or video of the ride in progress taken from one or more cameras associated with the vehicle. The administrative component may monitor traffic or events along the estimated route and can notify the driver of alternate routes via the mobile meter app 300. The administrative component may send to the mobile meter app 300 updated rate information related to the monitored traffic or events. The live ride control 226 may record/store at least a portion of each ongoing ride for later review or evidence.

The ride history control 228 may include a database of all rides, indexable by driver, vehicle, passenger, geographic area, address, payment information, and/or the like. As noted earlier, the passenger control 224 may in some embodiments access the ride history associated with a passenger. Similar access to ride history may be accessed via the vehicle control 220, the driver control 222, and, in some embodiments, the meter devices control 214 and/or fleet control 216, each access ride histories associated with the respective key feature (e.g., vehicle, driver, meter, or fleet).

The payment control 230 may include payment information generally, and may be indexed by passenger, driver, vehicle, operator, or the like. Payment information may include incoming payment information, e.g., from passengers, and may include tip or tax information. In some embodiments the payment information accessible via the payment control 230 may include accounts payable information for drivers and/or operators. In some embodiments the payment control 230 may securely store encrypted payment information, such as credit card information for access by an information owner, such as a passenger accessing the passenger's stored credit card information in order to make payment for a new fare/ride.

The analytics control 232 may include controls for analyzing data received and stored, such as highest producing drivers, most reliable vehicles, repeat customers (for offers, etc.), safety metrics, changes in patterns, and the like. The analytics may in some embodiments be accessible by custom database queries or by stored searches. Results of queries and searches may be displayed in a human-readable form and may in some embodiments be printable.

Figure 4:
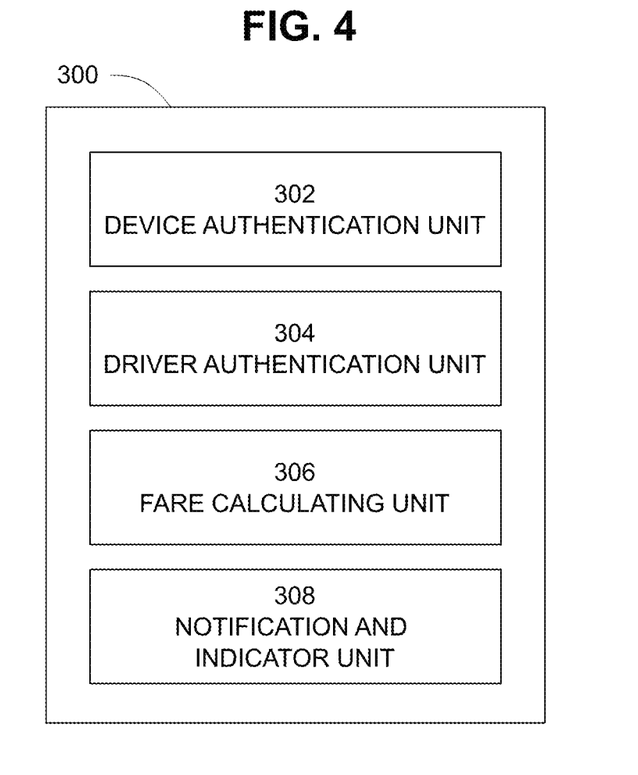
FIG. 4 is a functional block diagram showing functional blocks of a mobile meter app, according to an embodiment.

Turning now to the mobile meter app 300, FIG. 4 is a block diagram of a mobile meter app 300, according to an embodiment. The mobile meter app 300 may be downloadable to or remotely accessible via the mobile meter device 150. The mobile meter app 300 may include a mobile meter device authentication unit 302, a driver authentication unit 304, a fare calculating unit 306, and a notification and indicator unit 308. The fare calculating unit 306 may be configured to receive the fare attributes (e.g., from the remote or cloud-based administrative component 200 and to dynamically calculate a fare based on the fare attributes.

According to an embodiment, the mobile meter app 300 may connect to the administrative component 200 each time a Start control is engaged, receiving from the administrative component 200 fare attributes corresponding to a geofence area that encompasses a requested ride, including at least a distance rate and a wait-time rate. In the event no data connection can be made between the mobile meter app 300 and the administrative component 200, the mobile meter app 300 may use fare attributes (including at least distance rate and wait-time rate) from a previous connection while the mobile app periodically attempts to establish a connection to the administrative component 200. When a connection to the administrative component is established, the mobile meter app 300 obtains updated fare attributes for an upcoming or current ride. According to an embodiment, the updated fare attributes may be applied retroactively to adjust a fare from a pick-up location of the ride.

The mobile meter authentication unit 302 may be configured to send, to the administrative component authentication information. The administrative component 200 may check the authentication information against registered information and, if a match is identified, send an authentication to the mobile meter device 150 to enable the mobile meter app 300 to operate. The mobile meter authentication information may include a mobile meter device identifier (e.g., IMEI), a security token (e.g., PIN, 2-factor authentication code, or the like), vehicle ID (e.g., license number, VIN, or assigned number), and/or a private digital key. If the information does not match, the administrative component 200 may respond with an error message, and the administrative component 200 will not send an authentication to the mobile meter device 150 to enable the mobile meter app 300. Accordingly, the mobile meter app 300 will not operate. According to an embodiment, a failed authentication may result in locking of the mobile meter app 300 until a manual code is entered, or until an administrator releases a lock of the mobile meter app 300.

The driver authentication unit 304 may operate similarly to the vehicle authentication unit 302. For example, a driver may enter or select personal identifying information, such as a driver name or ID (e.g., license number), a security token (e.g., PIN, 2-factor authentication code, or the like), and/or private digital key. The administrative component 200 may identify the driver against a known list or database to ensure the driver is authorized. In some instances, the administrative component 200 may analyze a driver's history in determining whether or not to authorize the driver. For example, if the driver has worked a very long shift and is likely to be tired, or has a recent history of accidents, etc., the administrative component 200 many deny authorization. In an embodiment, the driver authentication unit may receive credentials to authorize a new driver. In such embodiment, the mobile meter app 300 may capture photos or other documents of the driver, driver license, driving record, vehicle information and the like for transmission to the administrative component for automatic or manual analysis.

The fare calculating unit 306 may be configured to receive the first set of fare attributes (described above) from the administrative component 200 and to dynamically calculate a fare based on the first set of fare attributes and a second set of fare attributes entered via the GUI 310 of the mobile meter app 300.

The notification and indicator unit 308 of the mobile meter app 300 may include circuitry (or instructions for programming a general-purpose computer) configured or programmed to receive a communication from the administrative component 200 indicating a pickup request from a ride requestor. The request may be received by the mobile meter app 300 based on availability of the driver, i.e., logged in or authenticated and not currently driving a passenger (or is nearing completion of a ride, and based on match with requestor preferences. The notification may be delivered with one or more of an audio signal, an LED flash or color, a screen indication, and/or an SMS/MMS message. The notification may include ride details including locations of pickup and drop-off, and fare attributes.

Figure 5:
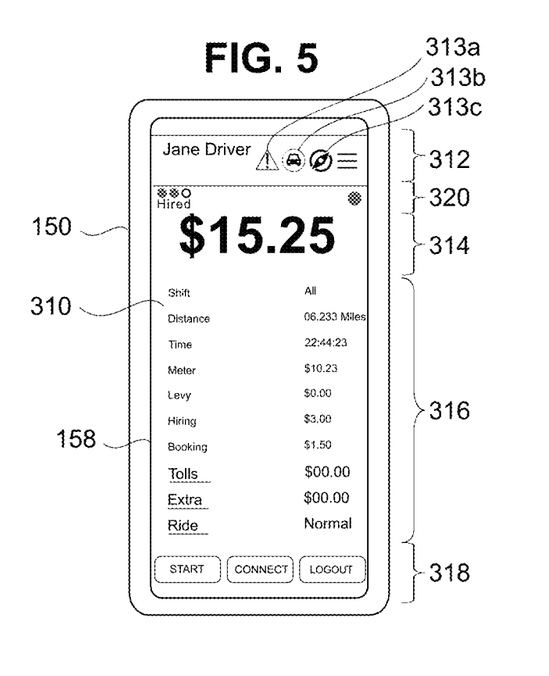
FIG. 5 illustrates a main screen of a graphical user interface for a mobile meter app, according to an embodiment.

The notification and indicator unit 308 may additionally control the appearance of indicators in the GUI 302 at an indicator section 320 (in FIG. 3). The indicators may signal, e.g., by color, each of a predetermined set of indications. For example, an indicator may signal GPS signal sufficiency while another indicator may signal Internet connection, and another may indicate calibration. Another indicator (e.g., as shown at right of section 320) may indicate, by color, that fare is being calculated based on distance (e.g., green) or based on time, such as wait time (e.g., red) or both (e.g., split color or third color). Further, the indicator section 320 may indicate that the vehicle is "Hired". In some instances, the notification and indicator unit 308 may be associated with an external indicator, such as a rooftop or windshield sign that may present an "Available" or "Hired" (or other relevant) signal to persons outside the vehicle.

According to an embodiment, the first set of fare attributes may correspond with a geofence region encompassing at least a portion of the ride. In some embodiments, the mobile meter app 300 or the administrative component 200 may determine that a requested ride includes travel in more than one geofence region. In such instance, in one embodiment, the mobile meter app 300 may obtain a new set of first fare attributes when the mobile meter device 150 nears or crosses from one geofence area to another. In another embodiment, the mobile meter app 300 may obtain and store more than one first set of fare attributes at the Start of the ride, and may apply one first set of fare attributes until the corresponding geofence boundary is crossed, then apply a different first set of fare attributes corresponding to the newly entered geofence area.

As noted above, the first set of fare attributes may be received by the mobile meter app 300 at each Start of a fare-earning trip, if a data connection to the administrative component 200 is available, and only when the mobile meter app 300 and driver have been authenticated. The second set of fare attributes may include a distance traveled attribute, a location attribute, a wait time attribute, and/or a traveled time attribute. The second set of fare attributes may additionally or alternatively include a road toll attribute, a non-traffic civic event attribute—for events that may affect demand for travel, and/or a traffic-affecting civic event attribute. In an embodiment, the second set of fare attributes may include a special request (or "extra") attribute such as a desired driver gender, a car seat request, an indication of heavy or numerous bags, a request for a particular number of passengers, or the like. One or more of the second set of fare attributes may be manually entered by the driver or automatically matched by the administrative component to a driver and vehicle. Each attribute may be indexed to a set fare adjustment, or a fare adjustment may be negotiated.

Dynamic calculation of a fare may include the processor 152 of the mobile meter device 150 executing instructions of the mobile meter app 300 that cause the mobile meter device 150 to receive, from one or more radionavigation satellites, a sequence of location coordinates as location attributes corresponding to respective locations of the mobile meter device during a ride. However, standard GPS signals can include inaccuracies of 5% or more. If each captured location coordinate is inaccurate, the error accumulates and the distance traveled cannot be accurately calculated resulting in increasingly unfair fares. Accordingly, the disclosed taxi meter system is made more accurate by use of map matching. That is, GPS coordinates may be corrected by applying coordinates from a map. For example, maps are available that include very accurate coordinates for roads, accurate enough to determine which lane a vehicle is traveling in.

The mobile meter app 300 may cause the mobile meter device 150 to send the location coordinates to a map-matching server running software for processing against a map to increase accuracy. The map-matching server may be the server computer 110, and the map-matching software may be part of the administrative component 300. In another embodiment, the map-matching may be processed at the mobile meter device itself. The mobile meter app 300 may then receive corrected coordinates from the map-matching server in near real time. The mobile meter app 300 may then calculate the distance traveled based on the corrected coordinates, capture times for each corrected coordinate corresponding to the location coordinates, and calculate the wait time attribute based on the corrected coordinates. The mobile meter device may further calculate the traveled time based at least on the capture times and apply corresponding fare attributes from the first set of fare attributes and the second set of fare attributes to at least the distance traveled, the wait time, and the traveled time to determine a total fare.

The map-matching server may be configured to correct each location coordinate such that the resulting corrected coordinates about 96% accurate. In another embodiment the corrected coordinates may be 99% accurate.

The instruction to calculate the distance traveled includes an instruction to aggregate distance from each of a plurality of segment distances, each segment distance including a distance calculated between two consecutive coordinates of the corrected coordinates. For example, if a ride includes (in a very simplified example) 10 coordinates captured along the route, a segment distance is the linear distance between the two coordinates, and the total distance is the sum of the consecutive segment distances. Likewise, a segment time is the difference between times recorded when the vehicle is at each captured coordinate. The total time is the sum of the segment times. From the segment times, and segment distances, it is a straightforward calculation to determine speed during each segment. When the coordinates are sufficient close together, the segment distances are small and may be useful for determining real-time speed along the route.

As many users of satellite-based radionavigation have experienced, there are times that received coordinates are not reliable due to building reflections, weather interference, tunnels, or the like. The taxi metering system 100 may be configured to mitigate this problem with respect to calculating a fare. The mobile meter app 300 may monitor radio navigational signal strength or may be notified by the administrative component 200 that reported coordinates do not match with a known road. When the coordinates are judged to be inaccurate at the Start of a trip, fare is accrued based on time only until the coordinates are determined to be reliable. More specifically, the initial location coordinates (L1) are ignored, but the start time (T1) is recorded. The mobile meter app 300 continues to periodically record time and location, determining if the location is reliable. The next reliable location (L2) is recorded with its corresponding time (T2). The start location L1 is assigned to be the same as the next reliable location L2, resulting in a segment distance of T2−T1=0. The corresponding segment time, T2−T1, is non-zero and a corresponding wait-time is calculated based on the time difference and is added to the total fare. In instances where the distance is large and cannot be ignored, map-matching may be employed, e.g., based on a pick-up address, to determine the segment(s) distance, to which corresponding fare attributes may be applied for calculation of fare amount for the segment(s).

Similarly, when satellite-based location coordinates (Ln) at a Stop or drop-off location are judged unreliable due to poor satellite reception or other reasons, the mobile meter app 300 may record the Stop time (Tn) and assign the last known location (Ln−1) as the coordinates for the Stop (Ln), resulting in a final segment distance (Ln−(Ln−1)) of zero. The fare for the segment may instead, therefore, be calculated by applying wait time rates to the time difference, Tn−(Tn−1). In instances where the actual distance from last-known location (Ln−1) to the Stop location (Ln) is large, the mobile meter app 300 or administrative component 200 may calculate a fare amount based on a map-matched distance (considering a drop-off address or other manually entered address), and added to the total fare.

In instances where the mobile meter app 300 judges the satellite-based location coordinates to be unreliable during a ride (sometime after the pickup/start and before the drop-off/stop, e.g., due to entering a tunnel), the mobile meter app 300 may record a last known time (Tn−1) and location (Ln−1), and calculate a segment distance between the last known location Ln−1 and the next known location Ln, applying the distance rate fare attribute to the segment distance. In instances where the segment distance is above a predetermined threshold, the distance may be interpolated, e.g., based on likely route, by map matching.

When a distance traveled during a predetermined time period (e.g., 10 seconds) is less than a predetermined distance (e.g., set by city regulation) an average time is added to the fare as wait-time. In a non-limiting example, a city regulation may set a minimum speed of 18 kilometers per hour (5 meters per second). In this case, using the example time sample period of ten seconds, if the mobile meter device travels at least 50 meters in ten seconds, the time is ignored for fare calculation purposes. However, if the distance is less than 50 meters, wait-time is calculated based on the distance traveled. That is, if the distance is 25 meters, 25/50*10 seconds=5 seconds added to the wait time. If the distance traveled in 10 seconds is 5 meters, 5/50*10 seconds=1 second of wait time added. Alternatively, the mobile meter app 300 may be configured to receive, for each location coordinate, a capture time corresponding to the location coordinate. The capture time may be obtained from the same radionavigation signal that provides location coordinates (e.g., GPS). In alternative embodiments, the capture time may correspond to a device time maintained by the mobile meter device 150 itself, or synchronized with a remote time server, or the like. As noted above, a segment time may be calculated for each segment distance as a difference between the capture times corresponding to the location coordinates. When the segment distance per segment time for a given segment is below a predetermined threshold value, the corresponding segment time is added to a total ride wait time.

FIG. 5 shows a graphical user interface (GUI) 310 of a mobile meter app 300, according to an embodiment. The mobile meter app 300 may display the GUI 310 on a screen 158 of a mobile meter device 150. The GUI 310 may permit a user/driver to interactively enter and receive information. According to an embodiment, the GUI 310 may include a driver information and configuration area 312, a dynamically updated fare area 314, a fare attributes display area 316, and a controls area 318. The mobile meter device 150 may be a smart phone, a tablet, a dedicated meter device, or the like that includes a touchscreen and/or keypad for receiving input.

The driver information and configuration area 312 may display a driver name, a driver ID, a license number and/or the like. Configuration options accessible from the driver information and configuration area 312 may include access to an emergency/distress call control 313*a*, a control 313*b* to open a navigation screen, and a control 313*c* to open a chat application. The chat application may be anonymous for communications between a driver and a passenger (e.g., communications to facilitate a pickup) and may, for example, permit a driver and administrator to converse when the driver is stopped. One of ordinary skill in the art will recognize that such controls need not be located in the driver information and configuration area 312. The mobile app 300 may be downloadable to or remotely accessible via a mobile meter device 150 (including any of mobile meter devices, e.g., 150, 150*b*, 150*c*).

The server 102 may include a stand-alone computer, or a hosted server or virtual server such as in a data center or "cloud" service. The server(s) 102 may include one or more processors, memory (RAM, ROM, cache, etc.), and communication circuitry. In either hosted or stand-alone embodiments, a plurality of processors may be cooperatively employed for load balancing. In some embodiments the remote server 102 may include a cloud server such as provided by GOOGLE CLOUD, AZURE, AMAZON WEB SERVICES (AWS), or the like, and functions of the remote server 102 may be accessed via a remote terminal, such as a web portal, or the like (not shown).

The GUI 302 of the mobile meter app 300 may provide at least one of an extra fee input and a discount input, respectively permitting an operator to modify a total fare by adding and/or subtracting an amount or a percentage of the fare. As noted above, extra fees may be appropriate when a particular vehicle is required due to amount of people or luggage, a car seat is needed, or the like.

Figure 6:
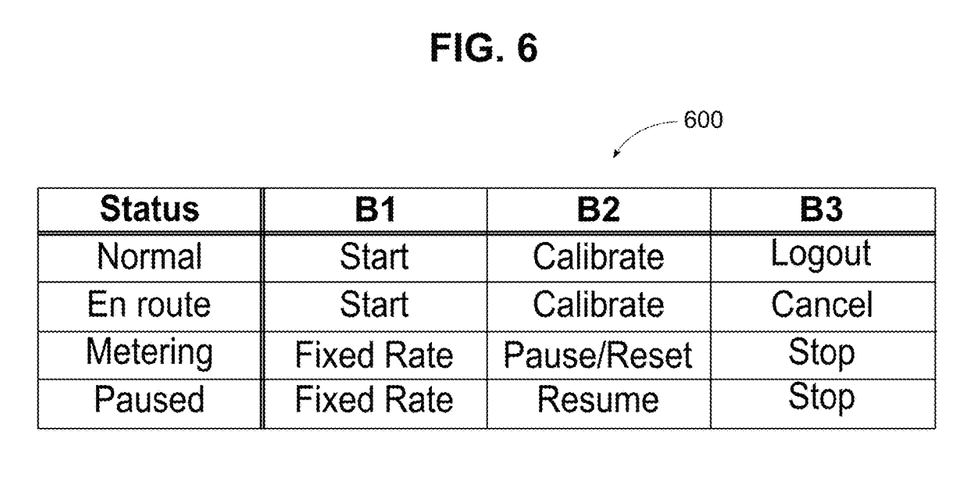
FIG. 6 is a table illustrating functions of controls in a GUI of a mobile meter app, according to an embodiment.

In FIG. 5, the control area 318 may include three buttons (referenced herein as B1, B2, and B3). Each of the buttons may is configured to provide a different function depending on state of the mobile meter app. FIG. 6 shows a table 600 describing the various functions of the buttons in the control area 318. Along the left side are the various states or actions for which the buttons B1, B2, B3 may have different functions: Normal, corresponding to a non-metering state; En Route, corresponding to a period between receiving a ride request and picking up the rider; Metering, corresponding to a period between picking up the rider and dropping off the rider; and Paused, corresponding to a period during a ride in which the fare calculation is temporarily stopped.

In the Normal status, button B1 displays "Start" and provides a function of starting fare calculation, i.e., measuring distances and times and calculating corresponding fare amount. Button B2 displays "Calibrate" and initiates a function of calibrating the mobile meter app 300 and/or the radionavigation (e.g., GPS) hardware of the mobile meter device 150. For example, pressing Calibrate may cause the mobile meter app 300 to survey accessible GPS (or other navigation/location) satellites, and to re-triangulate location based thereon. According to an embodiment, the calibration may include sending location data to the administrative component and receiving a map-corrected location in response. The third button, B3, may in the Normal status display "Logout", which when selected causes the mobile meter app 300 to logout the current user and/or shut down the mobile meter app 300.

In the En Route status, buttons B1 and B2 may display and function just as in the Normal status, described above. Button B3, however, may display "Cancel" and function to notify the administrative component that a received trip request is canceled (e.g., the rider canceled or the driver was delayed, etc.).

In the Metering status, button B1 may display "Fixed Rate" or similar, and when operated may cause the mobile metering app 300 to stop calculating fare normally (e.g., based on standard rates received from the administrative component) and may transition the mobile meter app 300 to a fixed rate entry view where a negotiated total fare or fare rate may be entered for the current ride. According to an embodiment, operating the Fixed Rate button mid-way through a ride may affect only the fare for the remainder of the ride, adding to the fare calculated up to that time. In another embodiment, operating the Fixed Rate button may affect the fare for the entire ride. During the Metering status, button B2 may display "Pause/Reset". When pressed, the button causes the mobile meter app 300 to enter the Paused state. In the Paused state, the mobile meter app 300 may cease to calculate fare temporarily (i.e., does not calculate based on distance or time). The third button, B3, displays "Stop" and when operated stops the fare calculation, triggers any final fare calculation, and notifies the administrative component to generate a receipt. According to an embodiment the Stop operation may also cause the mobile meter app 300 to display a final fare and/or a payment view, including features for adding a tip.

Figure 7:
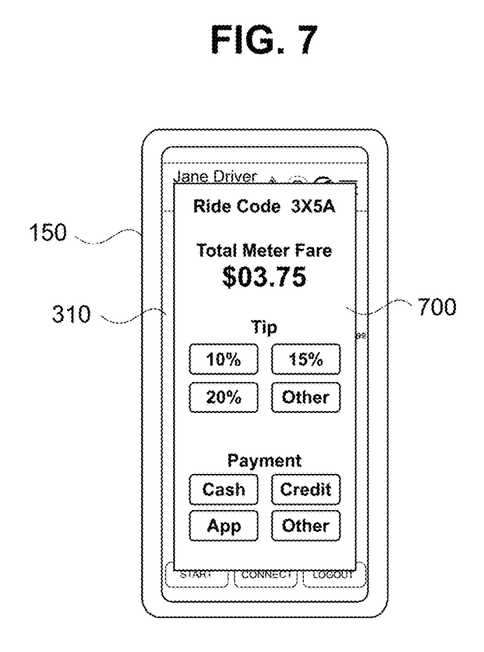
FIG. 7 illustrates a final fare and payment view of a graphical user interface for a diagram of a graphical user interface for a mobile meter app, according to an embodiment.

FIG. 7 illustrates a final fare and payment entry view 700 of the GUI 310 for the mobile meter app 300, according to an embodiment. The final fare and payment entry view 700 may be configured to provide a number of preconfigured tip percentages, or permit entry of a custom amount. The final fare and payment entry view 700 may further be configured to show one or more payment means, such as cash, credit, payment app, or other (e.g., bitcoin) means. When the fare, tip, and payment means are completed, a receipt view 800 may be presented by the mobile meter app 300.

Figure 8:
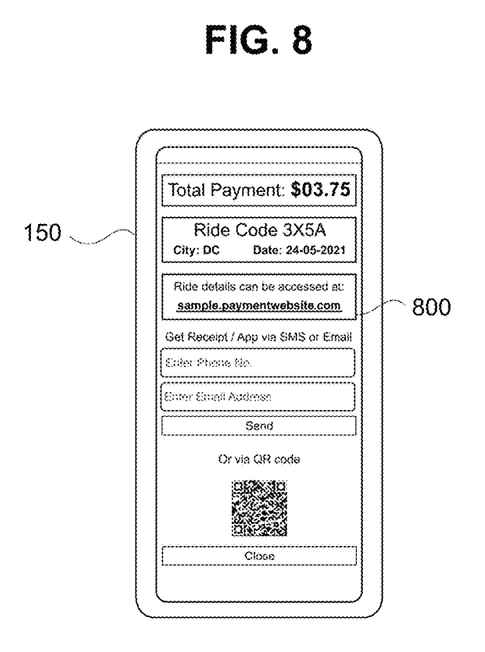
FIG. 8 illustrates a receipt view of a graphical user interface for a mobile meter app, according to an embodiment.

FIG. 8 illustrates a receipt view 800 of the GUI 310 for the mobile meter app 300, according to an embodiment. The receipt view 800 may show the total fare, ride details (code, location, date, etc.), and fields for entry of rider information to permit transmission of the receipt to the rider, e.g., by phone, email, website (using a ride code), and/or a machine-readable code such as a QR code. An emailed or web-accessible receipt is described below with reference to FIG. 9. Those having skill in the art will acknowledge that the particular layout, tip amounts, and payment means may vary based on location, local idiom, etc.

In the Pause state, the buttons of the control area 318 show "Fixed Rate" for B1, "Resume" for B2, and "Stop" for B3. The functions of B1 and B3 are as described above for the Metering state. However, the Resume function exits the Paused state, returning the mobile meter app 300 to the Metering state.

According to an embodiment the GUI 310 may include a control to manually add a toll amount. Activation of any one of the controls in the control area 318 may cause a record to be made, locally or at the administrative component 200, of the activated control together with at least one of a time and a location corresponding to the activation of the control. According to an embodiment the mobile meter app 300 may include an interface to a camera, either built into the mobile meter device, or remote thereto. The mobile meter app 300 may record one or more images (such as still images and/or video) video] of the ride from at least one perspective.

Figure 9:
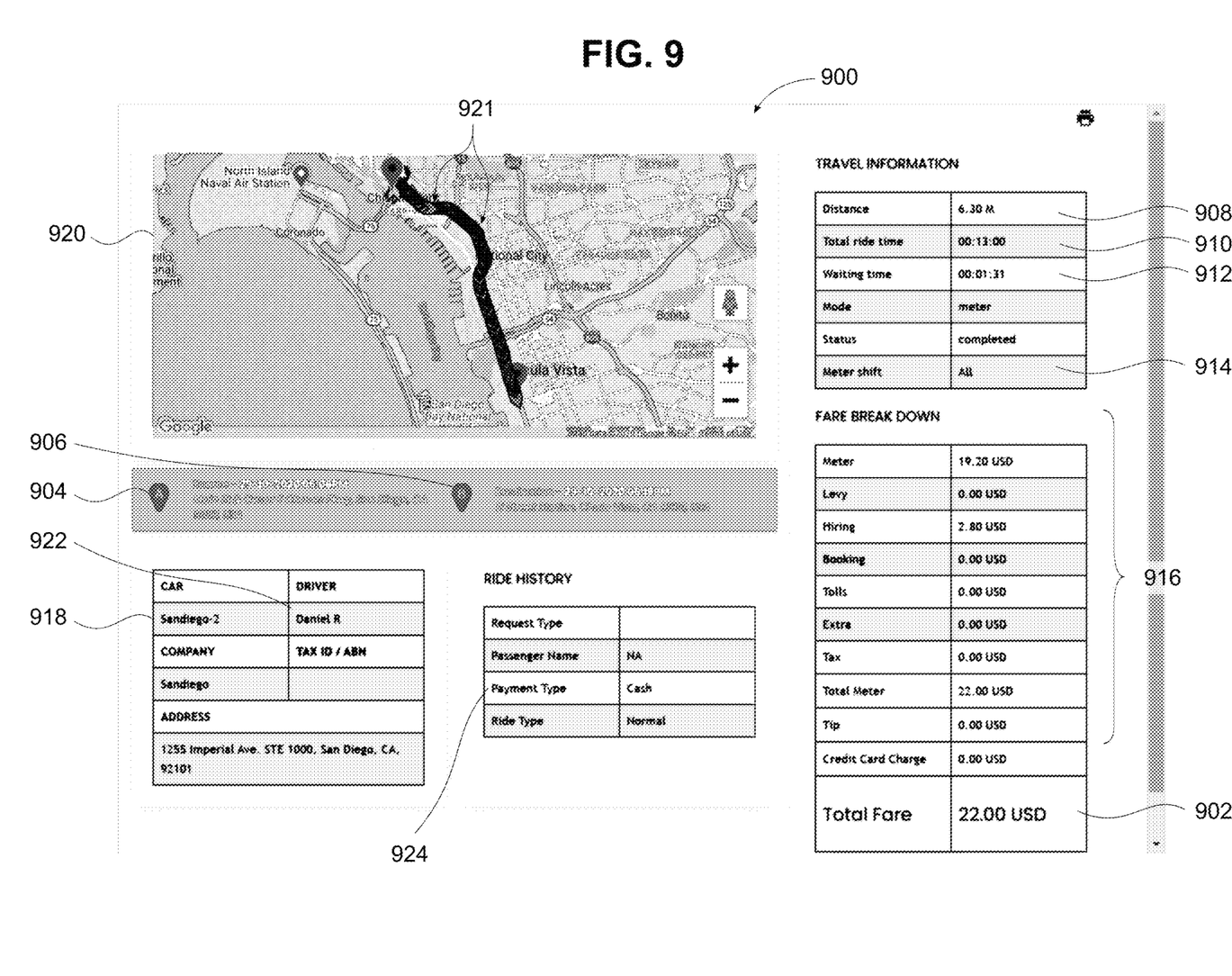
FIG. 9 illustrates a ride summary/receipt for a ride, according to an embodiment.

The administrative component 300 may receive each record for a corresponding ride, including one or more of distance, time, fare details, location breadcrumb, video files, images, etc. The administrative component may generate a receipt and/or ride summary for a rider guest. FIG. 9 illustrates a ride summary/receipt 900, according to an embodiment. The ride summary/receipt 900 may include one or more of: a total fare 902, a date of the fare (not shown), a pickup location 904, a drop-off location 906, a distance traveled 908, a total ride time 910, a wait time 912, meter shift(s) 914, a breakdown of charges 916, a map 920 of a route taken, a vehicle identifier 918, and may include one or more images (or video) of the ride (not shown). Images of certain locations—such as a beginning, end, and/or, landmarks along the way—may be included. The image(s)/videos may include a time and/or a location of each image/video. The ride summary may, according to an embodiment also include indications of a meter reset, an update request from an administrator or the administrative component 200, an operator identifier 922, and one or more payment-related fields 924.

The map 920 of the ride may include "breadcrumb" indicators 904 showing the route in colors corresponding to rate changes. That is, each breadcrumb may represent, by color, ride segments that were calculated by wait time or distance. For example, wait time segments may be shown in one color (e.g., red) while normal, distance-based fare segments may be shown in another color (e.g., green). When viewed electronically, interactive features of the ride summary may permit a viewer to select any route indicator to show information about that step of the ride. Source/pickup and destination/drop-off points are prominently identified on the map and detailed below. Information describing the vehicle and driver, ride request details, ride parameters and a breakdown of the fare are presented for easy rider viewing and understanding.

According to an embodiment, the mobile meter app 300 may include a payment receiving function, and may include a selection of various tip amounts or percentages, and payment type selection. According to an embodiment, the administrative component 200 may be configured to monitor the ride. For example, the administrative component may display current location coordinates of a mobile meter device 150, images or a video stream received from a camera associated with and disposed proximate the mobile meter device 150, and at least a subset of information that is displayed (or displayable) by the mobile meter app 300. Monitoring of the location coordinates for a mobile meter device 150 may include confirming that the mobile meter device 150 is within an authorized geographical operation area. In some embodiments the monitored video stream may be overlaid with GPS data that accurately identifies the location of the vehicle at the time video is captured for the video stream. GPS data may be overlaid with near-zero latency such that the administrative component can pinpoint a location of the mobile meter device. The video stream may be captured for later review, records, training or the like, and the video stream combined with precise location coordinates may be applied to self-driving mechanisms.

As noted above, the mobile meter app 300 may communicate with the administrative component 200 via a wireless data network 170, and each communication with the administrative component 200 during a ride may including a time, a location, and at least one of: a device identifier (e.g., IMEI), a driver name or ID, a security token (e.g., PIN), vehicle ID, and private key any of which may be used in creating a ride summary. According an embodiment, the device identifier (e.g., IMEI) and Driver ID may be sufficient to identify the device and driver.

According to an embodiment, the administrative component 200 may receive a ride request from a ride requestor. The ride request may provide request information including a pickup location and at least one of: a drop-off location, a pickup time, a drop-off time, a ride type, a driver type request (e.g., male, female, strong, quiet, talkative, etc.), a vehicle type request (e.g., normal, van, carpool, coupon, luxury), a number of bags, a number of passengers, and/or a car seat request. The requestor may omit some choices, in which a default or "don't care" option may be automatically selected. The administrative component may calculate an estimated total fare based on the request information provided in the ride request and send the estimated total fare to the ride requestor. The administrative component 200 may additionally report the estimated total fare to the mobile meter app 200 of one or more drivers that can satisfy the ride request. The administrative component 200 may permit manual assignment, e.g., by a live administrator, of a driver for the ride request from a selection of drivers satisfying availability criteria and Ride request profile matching a driver and a vehicle. In some embodiments, an incomplete match may be selectable when the number of matching drivers is small or zero. For example, if five drivers are available, and only the farthest away from the pickup is a complete match, one or more drivers in closer proximity may be judged as sufficiently matching the ride request profile. Alternatively or additionally, a ride requestor (rider/passenger) may select a driver and/or vehicle from a map service that locates and displays qualified or matched drivers and vehicles within a given vicinity that satisfy or most closely satisfy the requestor's request profile.

In an embodiment the administrative component 200 may automatically assign a driver based on the availability criteria, the availability criteria including a least one of proximity to the pickup location and matching of at least the requested ride type, driver type, and/or vehicle type. The administrative component 200 may receive and confirm a driver's acceptance of the assignment.

According to an embodiment, a passenger/rider mobile app or desktop computer application or web browser may access a passenger-facing aspect of the administrative component. This access may permit passenger/rider entry of, for example, profile information including preferences for drivers and vehicles, a home location, frequent destinations, default ride (e.g., a frequent commute route), desired extras, and the like. The mobile app (or desktop application or website) may permit a passenger/rider to request a ride, either based entirely on profile information or on an ad hoc basis per ride, or a combination of both (e.g., the passenger/rider can select a default ride and make modifications). In the case of a passenger mobile app, the mobile app can be executed on a smart phone (for example, running ANDROID or iOS operating systems), personal assistant, or other mobile device having network access.

According to an embodiment, the mobile meter app 300 may calculate the total fare in real time and report the calculated total fare to the administrative component while in near real time.

The mobile app may, in some implementations, store or dynamically receive from the administrative component a maximum fare amount and a minimum fare amount each corresponding to a predetermined geographic area defined by a geo-fence. The minimum fare amount may be based at least on a published market fare within the geographic area. For example, various public or collected fare information from ride share providers (e.g., LYFT, UBER, etc.) for routes in the geographic area for different times of day and amounts of demand may be collected and identified for a minimum fare amount. In an embodiment, an average of several ride characters may define the minimum fare amount. In another embodiment, the lowest published fare amount for a route may be set as the minimum fare amount. In some embodiments of the taxi metering system 100, the controls 318 for manually changing the total fare to a fixed amount may reject a total fare that is below the minimum fare amount or is below the maximum fare amount. The maximum fare amount may be set by a governing body, such as a city/county/state/country ordinance). The minimum fare amount may correspond to a ride share price or average ride share price for the ride.

In accord with some embodiments a driver and rider may negotiate price remotely or anonymously prior to a ride. For example, the ride may use a smartphone app to request and negotiate a ride from a driver that is willing. The administrative component 200 may be configured to receive a rider fare offer for an identified ride, receive, from the mobile app 300 of at least one mobile meter device 150, a driver fare offer for the identified ride. The administrative component 200 may automatically reject the driver fare offer or the rider fare offer if it is not between the maximum fare amount and the minimum fare amount.

In some embodiments, the travel time and/or the wait time measurements can be disabled, for example in favor of a negotiated fare. In an implementation, such disabling can be realized by disabling and algorithm for use of GPS and/or map matching for time and distance. Further, the distance measurement can be disabled. When the mobile meter device 150 is at rest or moving at a speed lower than a predetermined threshold, e.g., a speed determined by a governing body or an agreement/contract, the mobile app may indicate that a fare is being calculated based on time, and when the mobile meter device is moving at a speed greater than the predetermined threshold, the mobile app may indicate that the fare is based on distance.

Embodiments of a hardware architecture for implementing certain embodiments are described herein. One embodiment can include one or more computers (e.g., server(s)) communicatively coupled via a computer network, such as but not limited to the Internet. As is known to those skilled in the art, the computer can include a central processing unit ("CPU"), at least one read-only memory ("ROM"), at least one random access memory ("RAM"), at least one hard drive ("HD"), and one or more input/output ("I/O") device (s). The I/O devices can include a keyboard, monitor, printer, electronic pointing device (such as a mouse, trackball, stylus, etc.) or the like. In various embodiments, the computer has access to at least one database over the network.

ROM, RAM and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD or the like.

2At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

A "user" refers to one or more entities or people using any of the components and/or elements thereof as described herein. In some embodiments, the user may be a user of an electronic device. In other embodiments, the user may be a user of a computing device. Users described herein are generally either creators of content, managers of content, merchants, and/or consumers. For example, a user can be an administrator, a developer, a group of individuals, a content provider, a consumer, a merchant, a representative of another entity described herein, and/or the like.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations include, but is not limited to: "for example," "for instance," "e.g.," "in one embodiment."

It should be noted that while the examples and embodiments disclosed herein may be limited to certain types of users, environments, etc. (e.g., taxi driver, taxi), these limitations are only for purposes of ease of understanding and should not be deemed to limit the disclosure in scope. For example, the disclosed system is not limited to a taxi system but instead may be adapted and applied to other markets/industries that currently or may in future monitor and charge for travel by distance and time, (e.g., public transit, rail systems, air travel, water taxi, etc.).

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

What is claimed is:

1. A taxi metering system, comprising:
a first non-transitory storage medium having stored thereon instructions that, when executed by a computer, provide an administrative component of the taxi metering system, including a graphical user interface presented on a computer display, the administrative component configured to remotely establish a first set of fare attributes associated with one or more respective geographic operation areas, and to authorize and deauthorize operation of a mobile meter device based on whether or not the mobile meter device is within a predetermined geographic operation area of the one or more respective geographic operation areas; and
a second non-transitory storage medium having stored thereon a mobile app that, when executed by the mobile meter device, causes the mobile meter device to present a graphical user interface (GUI) of the mobile app on a display of the mobile meter device, the mobile app including a mobile meter device authentication unit, a driver authentication unit, a fare calculating unit, and a notification and indicator unit, the fare calculating unit configured to receive the first set of fare attributes from the administrative component and to dynamically calculate a fare based on the first set of fare attributes and a second set of fare attributes entered via the GUI.

2. The taxi metering system according to claim 1, wherein the first set of fare attributes includes a distance rate, a wait-time rate, a traveled-time rate, and a hiring fee.

3. The taxi metering system according to claim 2, wherein the first set of fare attributes further includes one or more of a booking fee, a vehicle type multiplier, a service type multiplier, a moving distance index, a wait time index, and a traveled time index.

4. The taxi metering system according to claim 1, wherein the first set of fare attributes are set by the administrative component for all mobile meter devices authorized in the predetermined one or more of the one or more respective geographic operation areas.

5. The taxi metering system according to claim 1, wherein the geographic operation areas are defined by a set of map-matched, satellite-based radionavigation coordinates constituting a boundary.

6. The taxi metering system according to claim 1, wherein the taxi metering system is stored at and accessed from a cloud-based server.

7. The taxi metering system according to claim 1, wherein the first set of fare attributes are associated with at least one meter shift of a plurality of meter shifts, each meter shift corresponding to one or more predetermined time periods each defined by at least one of a shift start time, a shift stop time, a day of the week, an event in a geofenced area, a traffic status, an event traffic status, and a shift duration.

8. The taxi metering system according to claim 7, wherein the second set of fare attributes includes a distance traveled attribute, a location attribute, a wait time attribute, a traveled time attribute, a road toll attribute, a non-traffic civic event attribute, a special request attribute, and a traffic-affecting civic event attribute.

9. The taxi metering system according to claim 8, wherein to dynamically calculate the fare includes executing instructions that cause the mobile meter device to:
receive, from one or more radionavigation satellites, a sequence of location coordinates as location attributes corresponding to respective locations of the mobile meter device during a ride,
send the location coordinates to a map-matching server;
receive corrected coordinates from the map-matching server in near real time;
calculate the wait time attribute based on the corrected coordinates and capture times for each corrected coordinate corresponding to the location coordinates;
calculate the distance traveled attribute based on the corrected coordinates;
calculate the traveled time attribute based at least on the capture times; and
apply corresponding fare attributes from the first set of fare attributes and the second set of fare attributes to at least the distance traveled, the wait time, and the traveled time to determine a total fare.

10. The taxi metering system according to claim 9, wherein the map-matching server is the administrative component, and the map-matching server is configured to correct each location coordinate based on a map, the correction of the location coordinates increasing accuracy of the resulting corrected coordinate to at least 96%.

11. The taxi metering system according to claim 9, wherein the instruction to calculate the distance traveled includes an instruction to aggregate distance from each of a plurality of segment distances, each segment distance including a distance between two consecutive coordinates of the corrected coordinates.

12. The taxi metering system according to claim 11, wherein the instruction to calculate the wait time includes instructions to:
receive, for each location coordinate, the capture time corresponding to the location coordinate,
calculate a segment time for each segment distance as a difference between the capture times corresponding to the location coordinates, and
when the segment distance per segment time for a given segment is below a predetermined threshold value, add the corresponding segment time to a ride wait time.

13. The taxi metering system according to claim 10, wherein
the location coordinates are received at regular intervals having a predetermined period, each segment distance corresponding to the predetermined period and
the instruction to calculate the wait time includes instructions to:
if the segment distance is less than a predetermined threshold distance for the predetermined period, add to a ride wait time an amount equal to the predetermined period multiplied by the segment distance divided by the predetermined threshold distance.

14. The taxi metering system according to claim 1, wherein the GUI of the mobile app further provides at least one of an extra fee input and a discount input, respectively permitting a driver to modify a total fare by adding and subtracting an amount or a percentage of the fare.

15. The taxi metering system according to claim 1, wherein the mobile app includes:
- a graphical user interface (GUI) having controls for starting the fare calculating unit, stopping the fare calculating unit, pausing the fare calculating unit, manually changing the total fare to a fixed amount, and manually adding a toll amount, wherein activation of any one of the controls causes a record to be made of the control activated together with at least one of a time and a location corresponding to the activation of the control; and
- wherein the mobile app records one or more images of the ride from at least one view.

16. The taxi metering system according to claim 15, wherein the GUI of the mobile app further includes
- a control to request emergency assistance,
- a navigation screen, and
- access to a chat service.

17. The taxi metering system according to claim 15, wherein the administrative component receives from the mobile app each record for a corresponding ride and the one or more images and generates a ride summary for a guest, the ride summary including one or more of: a total fare, a date of the fare, a pickup location, a drop-off location, a distance traveled, a total ride time, a wait time, a meter shift, a breakdown of charges, a map of a route taken, a vehicle identifier, the one or more images of the ride, a driver identifier, and one or more payment-related fields.

18. The taxi metering system according to claim 17, wherein the ride summary includes the map of the route taken, and the map includes route indicators respectively configured to indicate a fare rate for each step of the route.

19. The taxi metering system according to claim 18, wherein the route indicators are color coded to indicate rate changes along the ride.

20. The taxi metering system according to claim 19 wherein the route indicators interactively show information about each step of the ride.

21. The taxi metering system according to claim 15, wherein the administrative component is further configured to monitor at least one of:
- the location coordinates of the mobile meter device,
- images or a video stream received from a camera associated with and disposed proximate the mobile meter device, and
- a display of at least a subset of information displayable by the mobile app; and
- the monitoring of the location coordinates includes confirming that the mobile meter device is within an authorized geographical operation area.

22. The taxi metering system according to claim 21, wherein the monitored video stream is overlaid with GPS data that accurately identifies the location of the vehicle at the time video is captured for the video stream.

23. The taxi metering system according to claim 15, wherein the mobile app is further configured to store or dynamically receive from the administrative component, in correspondence with at least one district defined by a geo-fence, a maximum fare amount and a minimum fare amount, the minimum fare amount based at least on a published market fare within the district, a time of day and a demand within the at least one district; and
- wherein the controls for manually changing the total fare to a fixed amount permits entry only of a total fare that is at or above the minimum fare and at or below the maximum fare.

24. The taxi metering system according to claim 1, wherein the mobile app communicates with the administrative component via a wireless data network, each communication with the administrative component during a ride including a time, a location, and
- at least one of a device identifier (e.g., IMEI), a driver name or ID, a security token, vehicle ID, and private key any of which may be used in creating a ride summary.

25. The taxi metering system according to claim 1, wherein the administrative component is further configured to:
- receive a ride request from a ride requestor, providing request information including one or more of a pickup location and at least one of a drop-off location, a pickup time, a drop-off time, a ride type, a driver type request, a vehicle type request, a number of bags, a number of passengers, and a car seat request;
- calculate an estimated total fare based on the request information;
- send the estimated total fare to the ride requestor;
- report the estimated total fare to the mobile app;
- assign a driver for the ride request selectively based on a manual selection of a driver from a selection of drivers satisfying availability criteria and/or an automatic selection of a driver by the administrative component based on the availability criteria, the availability criteria including at least one of proximity to the pickup location and matching of at least the requested ride type, driver type, and vehicle type; and
- confirm driver acceptance of the assignment.

26. The taxi metering system according to claim 25, wherein the manual selection of a driver and vehicle from the selection of drivers includes: presenting to the ride requestor a list or proximity map of the drivers and vehicles that both satisfy the availability criteria and match at least the requested ride type, driver type, and vehicle type; and
- receiving a driver and vehicle selection from the list or proximity map of drivers and vehicles.

27. The taxi metering system according to claim 1 wherein a total fare is calculated by the mobile app in real time and reported to the administrative component.

* * * * *